United States Patent
Gosling et al.

(10) Patent No.: US 7,730,756 B2
(45) Date of Patent: Jun. 8, 2010

(54) TURBINE VANE AIRFOIL RECONFIGURATION METHOD

(75) Inventors: Martin C. Gosling, Ontario (CA); Jefferson Davis, Emory, TX (US); Yong Kang, Richardson, TX (US)

(73) Assignees: Siemens Energy, Inc., Orlando, FL (US); Chromalloy Gas Turbine LLC, Orangeburg, NY (US)

( * ) Notice: Subject to any disclaimer, the term of this patent is extended or adjusted under 35 U.S.C. 154(b) by 0 days.

(21) Appl. No.: 12/372,168

(22) Filed: Feb. 17, 2009

(65) Prior Publication Data

US 2009/0260206 A1    Oct. 22, 2009

Related U.S. Application Data

(62) Division of application No. 11/249,791, filed on Oct. 13, 2005, now Pat. No. 7,503,113.

(51) Int. Cl.
*B21D 53/78* (2006.01)
*B21D 3/16* (2006.01)
*B23P 6/00* (2006.01)

(52) U.S. Cl. .................... 72/388; 72/414; 72/416; 29/889.1; 29/889.7; 29/889.23

(58) Field of Classification Search ............... 72/21.1, 72/21.5, 414, 416; 29/23.51, 889.1, 889.2, 29/889.7, 889.23, 889.72, 889.73
See application file for complete search history.

(56) References Cited

U.S. PATENT DOCUMENTS

| | | | |
|---|---|---|---|
| 3,032,092 A | 5/1962 | Erlbacher | |
| 3,280,607 A | 10/1966 | Whitmore et al. | |
| 3,621,700 A * | 11/1971 | Wachtell et al. | 72/308 |
| 3,818,646 A * | 6/1974 | Peterson | 451/365 |
| 3,866,448 A * | 2/1975 | Dennis et al. | 72/416 |
| 4,087,996 A * | 5/1978 | Paille | 29/889.21 |
| 4,498,617 A | 2/1985 | Guertin et al. | |
| 4,589,175 A | 5/1986 | Arrigoni | |
| 4,737,417 A * | 4/1988 | Mushardt et al. | 428/571 |
| 4,832,252 A | 5/1989 | Fraser | |
| 4,866,828 A | 9/1989 | Fraser | |
| 4,951,390 A | 8/1990 | Fraser et al. | |
| 5,048,743 A | 9/1991 | Walker et al. | |
| 5,269,057 A | 12/1993 | Mendham | |
| 5,713,233 A | 2/1998 | McCarthy et al. | |
| 5,913,555 A | 6/1999 | Richter et al. | |
| 6,006,407 A | 12/1999 | Reverman et al. | |
| 6,007,628 A | 12/1999 | Ittleson et al. | |
| 6,129,257 A | 10/2000 | Xu et al. | |
| 6,139,412 A * | 10/2000 | Dwyer | 451/365 |
| 6,172,327 B1 | 1/2001 | Aleshin et al. | |
| 6,177,038 B1 | 1/2001 | Reed et al. | |
| 6,265,022 B1 | 7/2001 | Fernihough et al. | |
| 6,490,791 B1 | 12/2002 | Surace et al. | |
| 6,531,005 B1 | 3/2003 | Bezerra et al. | |

(Continued)

Primary Examiner—David B Jones

(57) ABSTRACT

A system and method for reconfiguring an airfoil of a turbine vane segment. In at least one embodiment, the system may be used to straighten an airfoil of a turbine vane segment to remove lean, twist, or racking, or any combination thereof. The airfoil may be straightened by applying a load to an inner shroud in a direction that is generally tangential to an outer shroud of the turbine vane segment. Orifices may be cut into the airfoil suction side, inboard of the outer shroud, to facilitate the straightening process. The orifices may be sealed upon completion of the process.

10 Claims, 2 Drawing Sheets

U.S. PATENT DOCUMENTS

| | | |
|---|---|---|
| 6,532,656 B1 | 3/2003 | Wilkins et al. |
| 6,568,993 B1 | 5/2003 | Jones et al. |
| 6,595,401 B2 | 7/2003 | Collot et al. |
| 6,652,369 B2 | 11/2003 | Jones et al. |
| 6,732,910 B2 | 5/2004 | Benedetti et al. |
| 6,755,924 B2 | 6/2004 | Harrison et al. |
| 6,792,655 B2 | 9/2004 | Wah |
| 6,938,447 B2 | 9/2005 | Fuse et al. |
| 7,328,496 B2 | 2/2008 | Powers et al. |
| 7,503,113 B2 * | 3/2009 | Gosling et al. ............. 29/889.1 |
| 7,536,783 B2 * | 5/2009 | Davis et al. ................ 29/889.1 |
| 2002/0085917 A1 | 7/2002 | Roberts et al. |
| 2004/0118175 A1 | 6/2004 | Lawrence et al. |
| 2004/0247442 A1 | 12/2004 | Nishimura et al. |
| 2007/0011872 A1 | 1/2007 | Leibfried et al. |

* cited by examiner

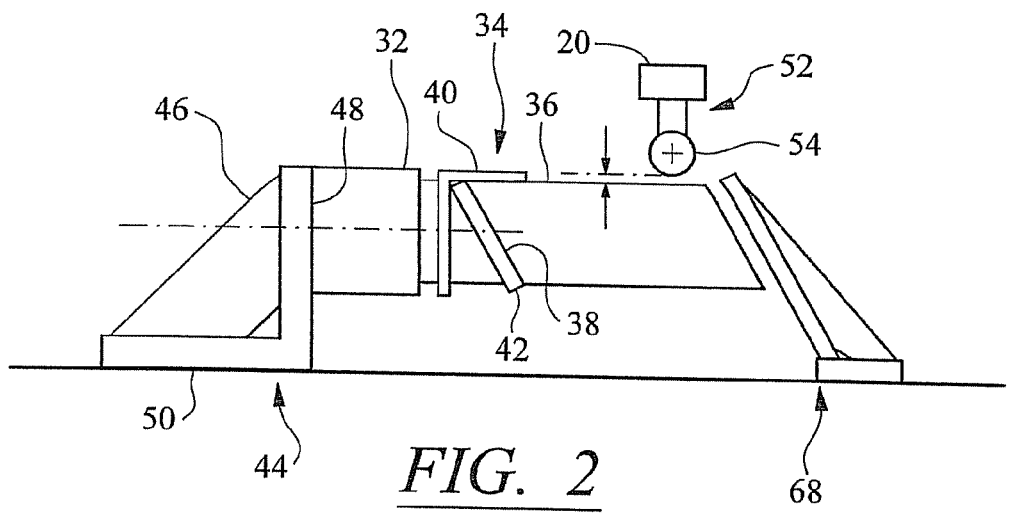
FIG. 2
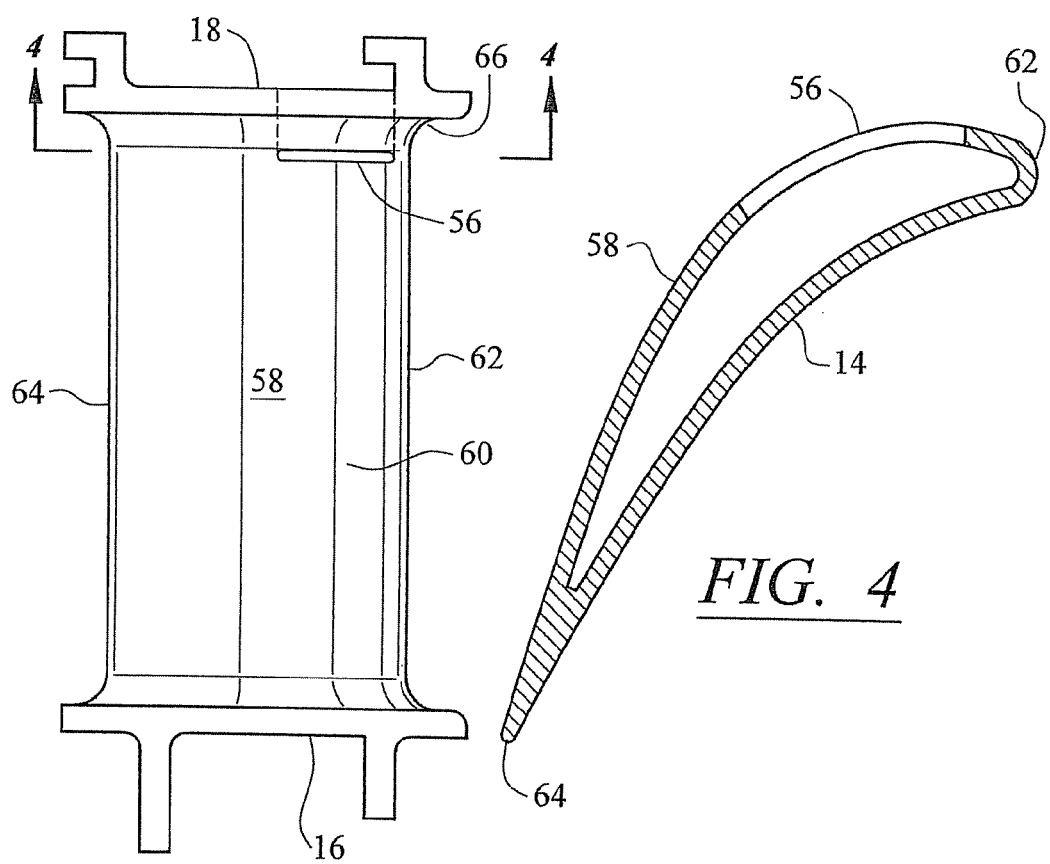
FIG. 3
FIG. 4

TURBINE VANE AIRFOIL RECONFIGURATION METHOD

CROSS REFERENCE TO RELATED APPLICATIONS

This is a divisional application of U.S. patent application Ser. No. 11/249,791, filed Oct. 13, 2005.

FIELD OF THE INVENTION

This invention is directed generally to turbine vanes, and more particularly to turbine vane distortion correction systems.

BACKGROUND

Airfoils of turbine vane segments often distort during use in a turbine engine in one or more of four ways. For instance, airfoils may lean, which is downstream deflection. Airfoils may twist, which is rotation of the inner shroud about a longitudinal axis extending between the inner and outer shrouds. Airfoils may be subjected to racking, which is inner shroud circumferential rotation about an engine centerline relative to the outer housing. Airfoils may also droop, which occurs when down stream portions of the outer housing deflect into the gas path. Such distortion conditions negatively affect performance of the turbine engine and may severely affect the lifecycle of the airfoil and inner and outer shrouds.

Conventional systems exist for removing twist from airfoils. However, conventional systems are time consuming. For instance, twist may be removed from an airfoil using a furnace cycle; yet, a furnace cycle is very time consuming. In addition, restoring a damaged airfoil to satisfactory tolerances is very difficult using conventional systems. Thus, a need exists for a more efficient airfoil repair system.

SUMMARY OF THE INVENTION

This invention relates to a system for reconfiguring an airfoil of a turbine vane segment. In at least one embodiment, the system may be used to straighten an airfoil of a turbine vane segment to remove lean, twist, or racking, or any combination thereof, in a single operation. The airfoil may be straightened by applying a force to an inner shroud of the turbine vane segment in a direction that is generally tangential to an outer shroud of the turbine vane segment.

The system may be formed from a fixture having reaction arms extending from the fixture. The reaction arms may be adapted to be inserted into recesses within an outer surface of an outer shroud of the turbine vane segment, wherein the reaction arms are supported by the fixture. The system may also include a force exertion system adapted to exert a force on an inner shroud of the turbine vane segment in a direction that is generally tangential to the outer shroud of the turbine vane segment. The force exertion system may include a jack, or other appropriate device, for exerting a force onto the inner housing. The force exertion system may also include a floating bracket having an extension arm for contacting a first side of the inner shroud of the turbine vane segment and a force application surface adapted to contact a second side of the inner shroud of the turbine vane segment, wherein the second side is adjacent to the first side of the inner shroud. The force exertion system may also include a reaction bracket for supporting the jack.

The system may also include a twist limiting device extending from the fixture for limiting twist of the turbine vane segment. The twist limiting device may be, but is not limited to being, a roller extending from the fixture to contact the inner shroud of the airfoil segment to limit twist of the airfoil. The system may also include a clamping device adapted to attach the turbine vane segment to the fixture to prevent the reaction arms from being dislocated from the recesses in the turbine vane segment. In at least one embodiment, the clamping device may be formed from at least one clamp.

The system may be used to straighten an airfoil of a turbine vane segment. A turbine vane segment may be attached to the system by engaging an outer shroud of the turbine vane segment with reaction arms supported by the fixture. The reaction arms may be inserted into recesses within an outer surface of the shroud. An inner shroud of the turbine vane segment may be engaged by a force exertion system for exerting a force in a direction that is generally tangential to the outer shroud. Orifices may be created in a convex side, also referred to as the suction side, of an airfoil portion of the turbine vane segment proximate to the outer shroud. The orifices may extend generally parallel to a filleted edge between the outer shroud and the at least one airfoil. The airfoil may be heated to facilitate twisting of the turbine vane segment. Once heated, a force may be applied to the inner shroud in a direction that is generally tangential to the outer shroud until the airfoil has been twisted to a desired position. After twisting, the orifices in the airfoil may be sealed. In at least one embodiment, the orifices may be sealed while the airfoil remains heated. The orifices may be sealed with a weld or other appropriate method. The airfoil may be reheated after welding to remove any distortion effects from welding.

An advantage of this invention is that the outer housing may be secured and a force may be applied to the inner shroud of the housing without additional bracing to twist the turbine vane airfoil to a desired position. This system and method results in a very efficient system capable of removing lean, twist, or racking, or any combination thereof, in a single system.

Another advantage of this invention is that the system is capable of repairing turbine vane segments effectively such that the repaired turbine vane segments are comparable to newly manufactured, unused turbine vane segments and are capable of replacing the newly manufactured, unused turbine vane segments, which is a feat not easily accomplished using conventional technologies. Thus, this invention results in significant time and cost savings.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 2 is a side view of the force exertion system shown in FIG. 1.

FIG. 3 is a side view of a single airfoil that forms a portion of a turbine vane segment.

FIG. 4 is a cross-sectional view of the airfoil shown in FIG. 3 taken at section line 4-4.

DETAILED DESCRIPTION OF THE INVENTION

Figure 1:
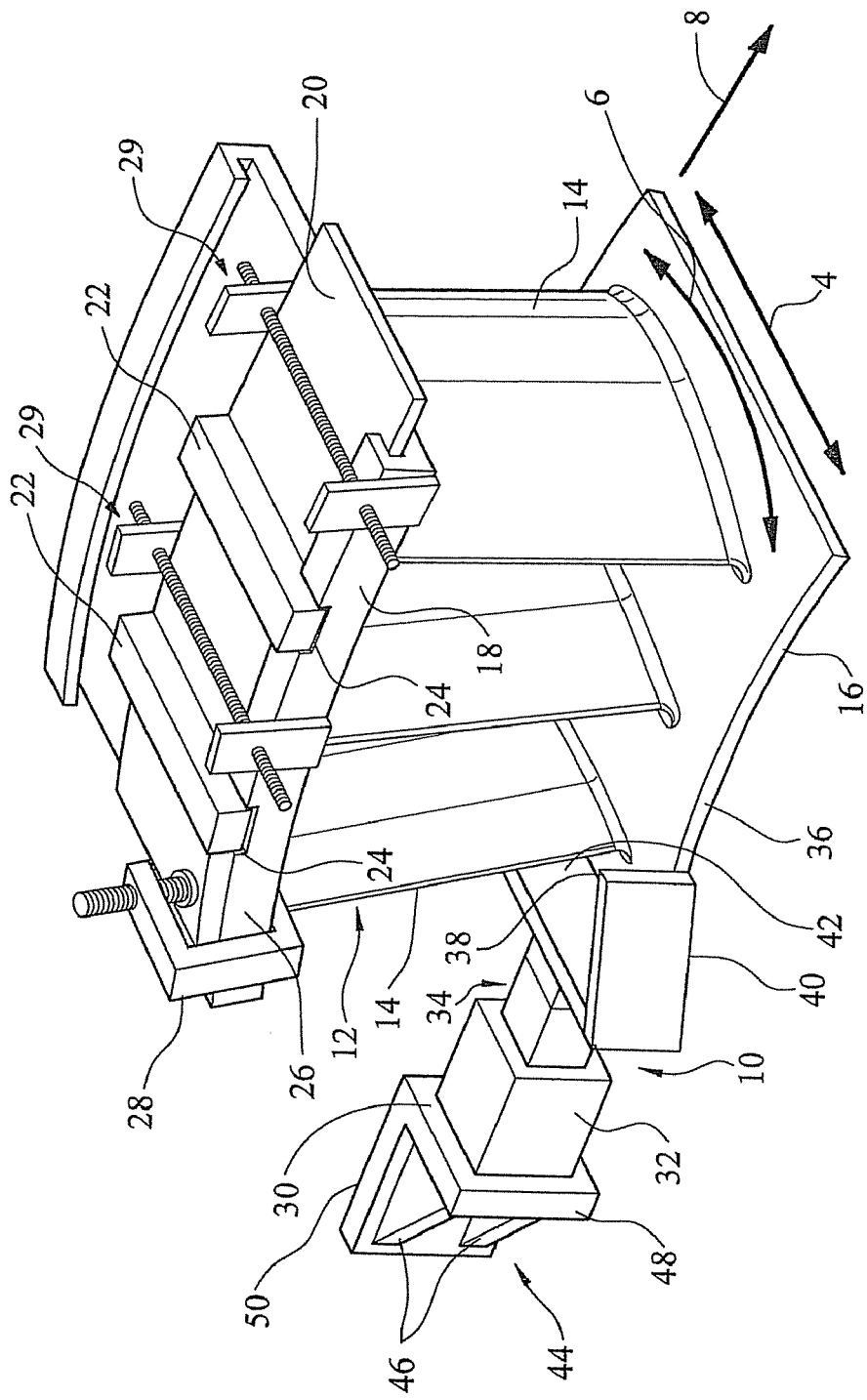
FIG. 1 is a perspective view of a turbine vane segment with a plurality of airfoils, wherein an outer shroud is attached to a fixture with reaction arms and a force exertion system is in contact with an inner shroud.

As shown in FIGS. 1-4, this invention is directed to system 10 for reconfiguring a turbine vane segment 12. In at least one embodiment, the system 10 may be used to straighten an airfoil 14 of a turbine vane segment 12 to remove lean 4, twist 6, or racking 8, or any combination thereof. The airfoil 14 may be straightened by applying a force to an inner shroud 16 of the turbine vane segment 12 that is generally tangential to an outer shroud 18 of the turbine vane segment 12.

As shown in FIG. 1, the system 10 may be formed from a fixture 20 configured to support one or more reaction arms 22. The reaction arms 22 may be configured to fit in recesses 24 on an outer surface 26 of an outer shroud 18 of the turbine vane segment 12 to position the turbine vane segment 12 within the system 10 and to prevent the outer shroud 18 from moving. The fixture 20 may be any device capable of supporting the turbine vane segment 12, and specifically, the outer shroud 18 of the segment 12. A clamping device 28 may be used to attach the outer shroud 18 to the fixture 20 and to prevent the reaction arms 22 from becoming dislocated from the outer shroud 18. In at least one embodiment, the clamping device 28 may be a C-clamp or other appropriate device. The clamping device 28 may be attached to one or more sides of the outer shroud 18. For instance, the clamping device 28 may be attached to opposite sides of the outer shroud 18, adjacent sides, all four sides, or any combination thereof. An axial clamping device 29 may be used to attach the outer shroud 18 to the fixture 20, as shown in FIG. 1. The axial clamping device 29 may be any appropriate device.

The system 10 may also include a force exertion system 30 for exerting a force on the inner shroud 16 of the turbine vane segment 12. In at least one embodiment, the force may be exerted on the inner shroud 16 in a direction that is generally parallel, or tangential, to the outer shroud 18. The force exertion system 30 may include a jack 32 for applying a force to the inner shroud 16. The jack 32 may be any conventional jack capable of applying an appropriate force, such as a hydraulic jack. The force exertion system 30 may also include a floating bracket 34 that is configured to contact at least two side surfaces 36, 38 of the inner shroud 16 to apply loads to the inner shroud 16. In at least one embodiment, as shown in FIG. 2, the floating bracket 34 may include an extension arm 40 extending from the floating bracket 34 to contact the first side surface 36 of the inner shroud 16. The floating bracket 34 may also include force application surface 42 for contacting the second side surface 38 of the inner shroud 16. The floating bracket 34 may be configured such that it is capable of applying a force to the inner shroud 16 on the side surface 38 in the tangential direction, but does not constrain the floating bracket 34 in another direction. However, the floating bracket 34 may include extension arm 40 configured to apply a tangential load to the nonparallel second side surface 38. In other embodiments, the floating bracket 34 may have other constraints.

The force exertion system 10 may also include a reaction bracket 44 for supporting the jack 32 and providing the jack 32 with a base from which to apply forces. The reaction bracket 44 may be formed from any appropriate configuration for supporting the jack 32. However, as shown in FIGS. 1 and 2, the reaction bracket 44 may include one or more ribs 46 for supporting the attachment of a support plate 48 to a base 50. The jack 32 may be attached to the support plate 48, and the base 50 may be attached to any sufficiently nonmovable foundation enabling a force to be applied to the inner shroud 16.

The system 10 may also include a twist limiting device 52, as shown in FIG. 2, for limiting twist of the turbine vane segment 12 while a load is applied by the force exertion system 30. The twist limiting device 52 may be attached to and extend from the fixture 20. In at least one embodiment, the twist limiting device 52 may be a roller 54 configured to contact the inner shroud 16.

The system 10 may be used to reconfigure an airfoil 14 of the turbine vane segment 12. In at least one embodiment, as shown in FIG. 1, the turbine vane segment 12 may include a plurality of airfoils 14, such as three airfoils. The system 10 may be used to straighten the airfoils 14. The process begins with the outer shroud 18 being placed into contact with the reaction arms 22 that are attached to the fixture 20. The outer shroud 18 may be secured to the fixture 20 using the clamping devices 28. The inner shroud 16 may be engaged by the force exertion system 30. The force exertion system 30 may be activated to extend the floating bracket 34 to contact the side surfaces 36, 38 of the inner shroud 16.

One or more orifices 56 may be cut into an outer surface 58 of the airfoil 14 to facilitate straightening of the airfoil 14. In at least one embodiment, as shown in FIGS. 3 and 4, the orifice 56 may be cut into a convex side 60, otherwise referred to as the suction side, of the airfoil 14. The orifice 56 may extend from a position in close proximity to a leading edge 62 of the airfoil 14 toward a trailing edge 64 of the airfoil 14. More specifically, the orifice 56, in at least one embodiment, may extend from a position in close proximity to a leading edge 62 of the airfoil 14 to between about one inch and about three inches toward the trailing edge 64. In one embodiment, the orifice 56 may be about 1.75 inches in length and about $\frac{1}{16}$ inches in width. The orifice 56 may be positioned inboard of the outer shroud 18 a distance equal to about a width of the filleted weld 66 between the airfoil and the outer shroud 18. The orifice 56 may also be aligned generally parallel with the outer shroud 18, which positions the orifice 56 generally parallel to a fillet 66 between the outer shroud 18 and the airfoil 14. The orifice 56 may extend from the outer surface 58 to an inner cooling cavity (not shown).

The airfoil 14 may be heated to facilitate straightening of the airfoil 14. In at least one embodiment, the airfoil 14 may be heated gradually to a temperature of between about 800 degrees Fahrenheit to about 900 degrees Fahrenheit. The airfoil 14 may be heated for example, with an oxy-acetylene torch having a rosebud nozzle.

Once heated, a load may be applied to the inner shroud 16 of the turbine vane segment 12. The load may be increased until the airfoil has been straightened to a desired position. The twist limiting device 52 may be used to prevent overtwisting of the airfoil 14. The twist limiting device 52 may be positioned proximate to the first side surface 36 of the inner shroud 16 at a position that prevents the airfoil 14 from being overtwisted. The twist limiting device 52 may also include a guide bar 68 for limiting twist of the airfoil 14. The guide bar 68 may be adjustable enabling different sized inner shrouds to be handled.

Once the airfoil 14 has been reconfigured a desired amount, the orifice 56 in the airfoil 14 may be sealed. In at least one embodiment, the orifice 56 may be sealed using conventional welding techniques, or other appropriate techniques. The orifice 56 may be sealed by welding the orifice 56 closed while the airfoil 14 remains heated and positioned within the fixture 20 and reaction arms 22 while under the load used to twist the airfoil 14. In at least one embodiment, the airfoil 14 may be heated to a temperature of between about 800 degrees Fahrenheit to about 900 degrees Fahrenheit. After sealing the orifice 56, the airfoil 14 may be heated again to minimize any distortion effects created by the welding.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A device for reconfiguring an airfoil of a turbine vane segment, comprising:
   a fixture adapted to receive and fix an outer shroud of the turbine vane segment;
   reaction arms extending from the fixture and adapted to be inserted into recesses within an outer surface of the outer shroud the turbine vane segment, wherein the reaction arms are supported by the fixture; and
   a force exertion system adapted to exert a force on an inner shroud of the turbine vane segment in a direction that is generally tangential to the outer shroud of the turbine vane segment while allowing movement in other directions.

2. The device of claim 1, wherein the force exertion system comprises a jack.

3. The device of claim 2, wherein the force exertion system comprises a floating bracket having an extension arm for contacting a first side surface of the inner shroud of the turbine vane segment and a force application surface adapted to contact a second side surface of the inner shroud of the turbine vane segment, wherein the second side surface is adjacent to the first side surface of the inner shroud.

4. The device of claim 3, wherein the force exertion system further comprises a reaction bracket for supporting the jack.

5. The device of claim 1, wherein the force exertion system comprises a floating bracket having an extension member for contacting a first side surface of the inner shroud of the turbine vane segment and a force application surface adapted to contact a second side surface of the inner shroud of the turbine vane segment, wherein the second side surface is adjacent to the first side surface of the inner shroud.

6. The device of claim 1, further comprising a twist limiting device extending from the fixture for limiting twist of the turbine vane segment.

7. The device of claim 6, wherein the twist limiting device comprises a roller extending from the fixture to contact the inner shroud of the turbine vane segment to limit twist of the airfoil.

8. The device of claim 6, wherein the twist limiting device comprises at least one guide bar extending from the fixture to contact the inner shroud of the turbine vane segment to limit twist of the airfoil.

9. The device of claim 1, further comprising a clamping device adapted to attach the turbine vane segment to the fixture to prevent the reaction arms from being dislocated from the recesses in the turbine vane segment.

10. The device of claim 9, wherein the clamping device comprises at least one clamp.

* * * * *